(12) United States Patent  
Moon et al.

(10) Patent No.: US 10,827,874 B2
(45) Date of Patent: Nov. 10, 2020

(54) AUTOMATIC BEVERAGE MAKER

(71) Applicant: NuWave, LLC, Libertyville, IL (US)

(72) Inventors: Jung S. Moon, Long Grove, IL (US); Jian Jiang Liu, Guangdong (CN)

(73) Assignee: NuWave, LLC, Vernon Hills, IL (US)

( * ) Notice: Subject to any disclaimer, the term of this patent is extended or adjusted under 35 U.S.C. 154(b) by 230 days.

(21) Appl. No.: 15/867,012

(22) Filed: Jan. 10, 2018

(65) Prior Publication Data

US 2018/0220834 A1 Aug. 9, 2018

Related U.S. Application Data

(60) Provisional application No. 62/444,453, filed on Jan. 10, 2017.

(51) Int. Cl.
| | |
|---|---|
| *A47J 31/40* | (2006.01) |
| *A47J 31/52* | (2006.01) |
| *A47J 31/06* | (2006.01) |
| *A47J 31/58* | (2006.01) |
| *A47J 31/56* | (2006.01) |

(Continued)

(52) U.S. Cl.
CPC ......... *A47J 31/407* (2013.01); *A47J 31/0642* (2013.01); *A47J 31/0689* (2013.01); *A47J 31/465* (2013.01); *A47J 31/52* (2013.01); *A47J 31/56* (2013.01); *A47J 31/58* (2013.01); *A47J 31/4457* (2013.01); *A47J 31/4478* (2013.01); *A47J 31/4482* (2013.01); *A47J 31/468* (2018.08); *A47J 31/54* (2013.01)

(58) Field of Classification Search
CPC .......... A47J 31/02; A47J 31/057; A47J 31/06; A47J 31/0642; A47J 31/10; A47J 31/24; A47J 31/407; A47J 31/4457; A47J 31/446; A47J 31/4478; A47J 31/4482; A47J 31/465; A47J 31/468; A47J 31/52; A47J 31/5251; A47J 31/5253; A47J 31/54; A47J 31/56; A47J 31/58; A47J 31/0689; B65D 85/8043; B65D 85/8049; B65D 85/8055

See application file for complete search history.

(56) References Cited

U.S. PATENT DOCUMENTS 2,498,950 A * 2/1950 Fowler ................. F24H 9/1818
                                                    392/459
5,190,653 A * 3/1993 Herrick .................... A47J 31/06
                                                    210/477

(Continued)

*Primary Examiner* — Matthew P Travers
(74) *Attorney, Agent, or Firm* — Bishop, Diehl & Lee, Ltd.

(57) ABSTRACT

An automatic beverage system for producing a hot flavored beverage. The system includes a base unit having a water reservoir, a control system for heating liquid from the reservoir, a cartridge arm having a water injector and a cartridge holder, a pump and tubing system connecting the water reservoir to the cartridge holder and used to move water, the control system housed within the base unit and coupled to the heating element and pump to control temperature and movement of the liquid from the reservoir to the cartridge holder, and a container base positioned in an area adjacent the base unit and below the cartridge holder. The cartridge holder is adapted to receive interchangeable cartridges depending on the type and size of beverage desired. The interchangeable cartridges include a water cartridge, a pod cartridge, and a grounds cartridge.

14 Claims, 23 Drawing Sheets

(51) Int. Cl.
  *A47J 31/46* (2006.01)
  *A47J 31/44* (2006.01)
  *A47J 31/54* (2006.01)

(56) References Cited

U.S. PATENT DOCUMENTS

| | | | | |
|---|---|---|---|---|
| 2005/0241487 | A1* | 11/2005 | Lowe | A47J 31/54 |
| | | | | 99/279 |
| 2007/0056994 | A1* | 3/2007 | Woodnorth | A47J 31/469 |
| | | | | 222/221 |
| 2007/0125763 | A1* | 6/2007 | Bauer | F24C 15/106 |
| | | | | 219/494 |
| 2007/0186779 | A1* | 8/2007 | Fung | A47J 31/0689 |
| | | | | 99/275 |
| 2011/0168029 | A1* | 7/2011 | Fulco | A47J 31/0689 |
| | | | | 99/295 |
| 2012/0285334 | A1* | 11/2012 | DeMiglio | A47J 31/0689 |
| | | | | 99/300 |
| 2013/0220136 | A1* | 8/2013 | De Jong | A47J 27/2105 |
| | | | | 99/285 |
| 2013/0344205 | A1* | 12/2013 | Oh | B65D 85/8043 |
| | | | | 426/232 |
| 2016/0255992 | A1* | 9/2016 | Miller | F16M 11/046 |
| 2018/0162634 | A1* | 6/2018 | De Ruvo | A47J 31/06 |

* cited by examiner

AUTOMATIC BEVERAGE MAKER

CROSS REFERENCE TO RELATED APPLICATION

The present application claims priority to U.S. Provisional Patent Application No. 62/444,453 filed Jan. 10, 2017 and is incorporated herein by reference in its entirety.

TECHNICAL FIELD OF THE INVENTION

The present invention relates to automatic beverage makers. Specifically, the invention relates to automatic beverage makers for brewing hot or cold beverages of various sizes including individual single-servings and large carafes.

BACKGROUND OF THE INVENTION

When it comes to one's morning routine, there are few things more satisfying than a cup of coffee. More than 50 years ago that meant a stove top coffee percolator which would repeatedly move heated water up a metal tube to spill over a small heap of fresh ground coffee beans. The automatic drip coffee maker was later introduced, which would heat water in a reservoir and slowly drip over a small heap of fresh ground coffee beans. The trend then turned to coffee shops on every corner, including STARBUCKS, GLORIA JEAN'S, DUNKIN donuts, and even MCDONALDS MCCAFÉ.

Despite the proliferation of these coffee shops, people still enjoy a good cup of coffee at home. The introduction of the automatic pod coffeemaker revolutionized the coffee industry by replacing slow drip coffeemakers and offering coffee enthusiasts a convenient cup of coffee without the need of going out and waiting in lines at coffee shops. Much like color television in the 1960's and smartphones in the 2000's, the popularity of pod coffeemakers has spread like wildfire over the last five years. Individual coffee pods now make it possible to have a hot cup of coffee in less than a minute. Coffee is not the only beverage that can be made from pod machines. Hot chocolate, tea, soup broths, and even hot apple cider are just a few of the possible beverages that can be made with pod machines.

However, these beverage machines are not without their drawbacks. For example, the pods are suitable for only a single cup of coffee or other beverages. Those who desire more than one cup of coffee could go through several pods every day. In situations where a full or half carafe of coffee is needed, pods are simply not appropriate. The pods are more expensive than a bag of coffee beans or grounds, and generate much more waste. Additionally, there are times where a user may want the option of using commercially available beverage pods, but also the option of grinding their own coffee beans to brew a more traditional carafe of coffee for several people. However, brewing coffee with a large amount of coffee grounds, compared to the amount of grounds in a single beverage pod, requires adequate water saturation of the beverage medium to ensure proper extraction. Thus, extraction needs for a pod versus a bed of coffee grounds is much different, and there exists a need to solve this problem using a single beverage system.

Yet another problem with traditional automatic beverage makers is maintaining the optimal water temperature when brewing a beverage. The internal hot water tank of traditional beverage makers is typically made of steel or other such metals. As the water heats in the metal tube, occasionally a perceptible metallic flavor is introduced.

Until the invention of the present application, these and other problems in the prior art went either unnoticed or unsolved by those skilled in the art. The present invention provides an automatic beverage maker which performs multiple functions with the associated pod devices to create a hot drink without compromising the flavor quality, style or affordability.

SUMMARY OF THE INVENTION

There is disclosed herein an improved automatic beverage system which avoids the disadvantages of prior devices while affording additional structural and operating advantages.

Generally, the beverage system comprises a base unit having a water reservoir, a control system, a pump and tubing system, a cartridge arm and a cartridge holder.

In specific embodiments of the beverage system, the control system is housed within the base unit and comprises a heating element, a pressure sensor and a housing, the heating element controls the temperature of the water in the housing and the pressure sensor regulates the water levels in the housing as the water is heated. A pump and tubing system are located within the base unit and connect the water reservoir to the housing and to the cartridge arm. A water injector is fixed to the cartridge arm and receives water from the housing when in operation. A cartridge holder is coupled to the cartridge arm and configured to receive a cartridge. During operation, water is dispensed from the water injector into the cartridge to form a beverage of choice.

In one embodiment, a container is preferably configured to sit on a container base positioned in an area adjacent the base unit and below the cartridge holder to accept brewed liquids. The container includes a lid having an inlet opening for accepting a heated liquid from the reservoir via a spout positioned on the cartridge holder.

In another embodiment, the cartridge holder is adapted to receive interchangeable cartridges including either a water cartridge, a pod cartridge and a grounds cartridge. Each cartridge serves a different function such as dispensing hot water, making an individual cup of coffee using a beverage pod, or brewing a half or full carafe of coffee using freshly ground coffee beans.

In yet another embodiment, a lid of the grounds cartridge is provided having a plurality of delivery holes configured to divert the water flow path over an entire bed of coffee grounds to maximize saturation of the grounds.

In other specific embodiments, the internal components of the beverage system are comprised of a glass housing and control system having a NTC Thermistor, a heating element, a double safety switch, pressure sensors, pump and a tubing system.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
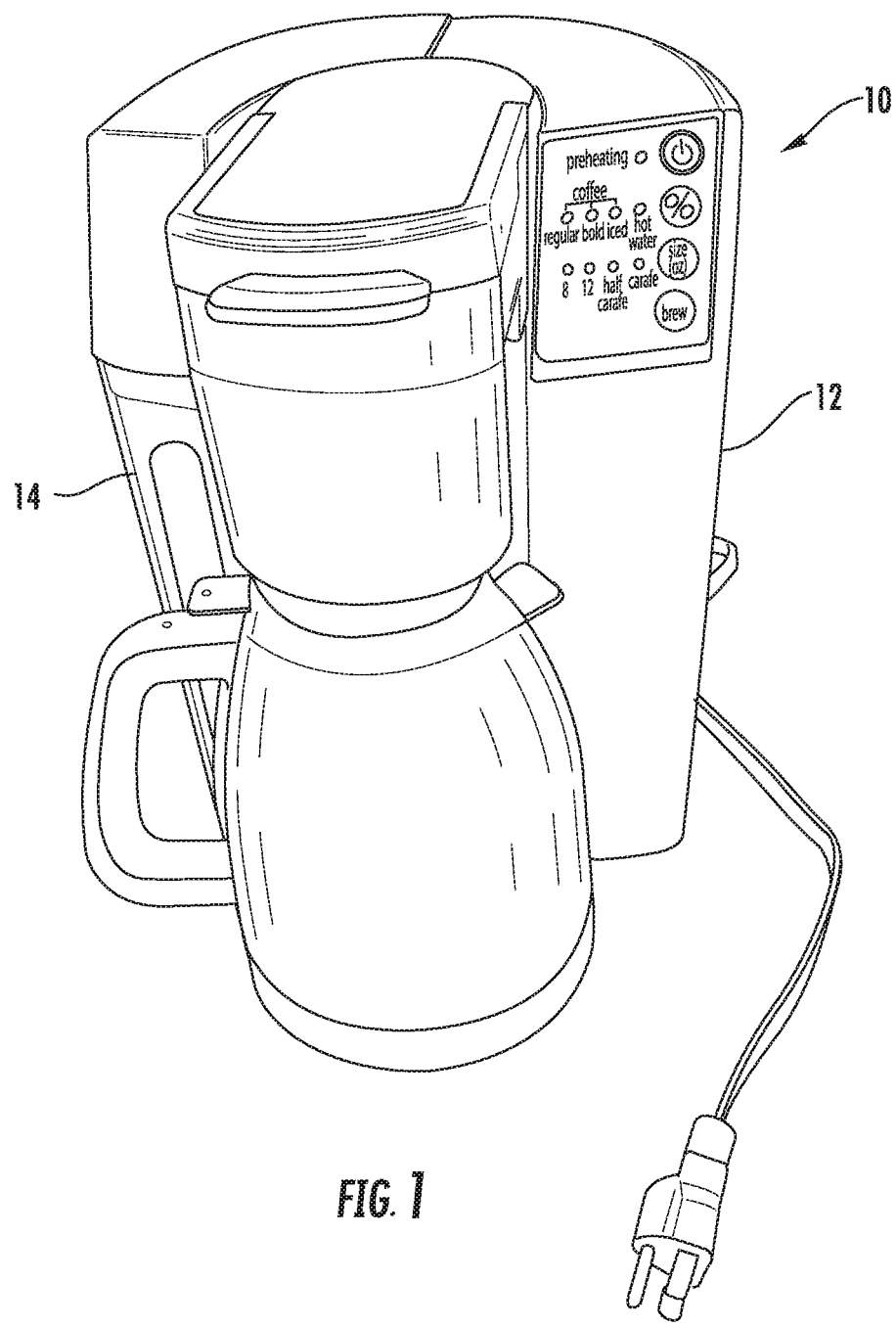
FIGS. 1-2 are a collection of images showing an embodiment of the beverage system in perspective views.

While this invention is susceptible of embodiments in many different forms, there is shown in the drawings and will herein be described in detail at least one preferred embodiment of the invention with the understanding that the present disclosure is to be considered an exemplification of the principles of the invention and is not intended to limit the broad aspect of the invention to any of the specific embodiments illustrated.

Referring to FIGS. 1-23, there is illustrated a beverage system, generally designated by the numeral 10, as well as various components for the system. As illustrated and discussed below, system 10 is most often used and described as a coffeemaker. However, it should be understood that the principles of the invention can be more broadly applied to a beverage system suitable for making coffee, tea and other hot beverages, as well as broths for soup, stews, and the like and even other types of drinks that may be served cold, such as iced tea and iced coffee.

As can be seen in FIGS. 1-4 and 20-21, the system 10 includes a base unit 12 having a water reservoir 14, a control system 16 for heating water from the reservoir 14, a cartridge holder 34, a pump 32 and tubing system 30 connecting the water reservoir 14 to the cartridge holder 34 and used to move water. A control system 16 is housed within the base unit 12 and coupled to the heating element 26 and pump 32 to control temperature and movement of the water from the reservoir 14 to the cartridge holder 34. A container 44 is configured to sit within an area adjacent the base unit 12 and below the cartridge holder 34.

Many factors contribute to making the perfect cup of coffee, but one of the most critical factors is maintaining an optimal water temperature during the brew process. Water is an essential part of the brewing process because water draws the flavor from coffee. This process is referred to as extraction. For optimal extraction, the water temperature should be between 195° F.-205° F. Over extraction occurs when the water is too hot, yielding coffee that tastes bitter, whereas under extraction occurs when the water is too cold, leaving coffee that tastes weak. Heating element 26 heats water from the reservoir 14 in a glass housing 18 to the optimal temperature. The water reservoir 14 can be configured to hold as little water as necessary for a single brew, or it may be larger to accommodate 48 oz., 60 oz., even 72 oz. volumes of water, as necessary.

Figure 20:
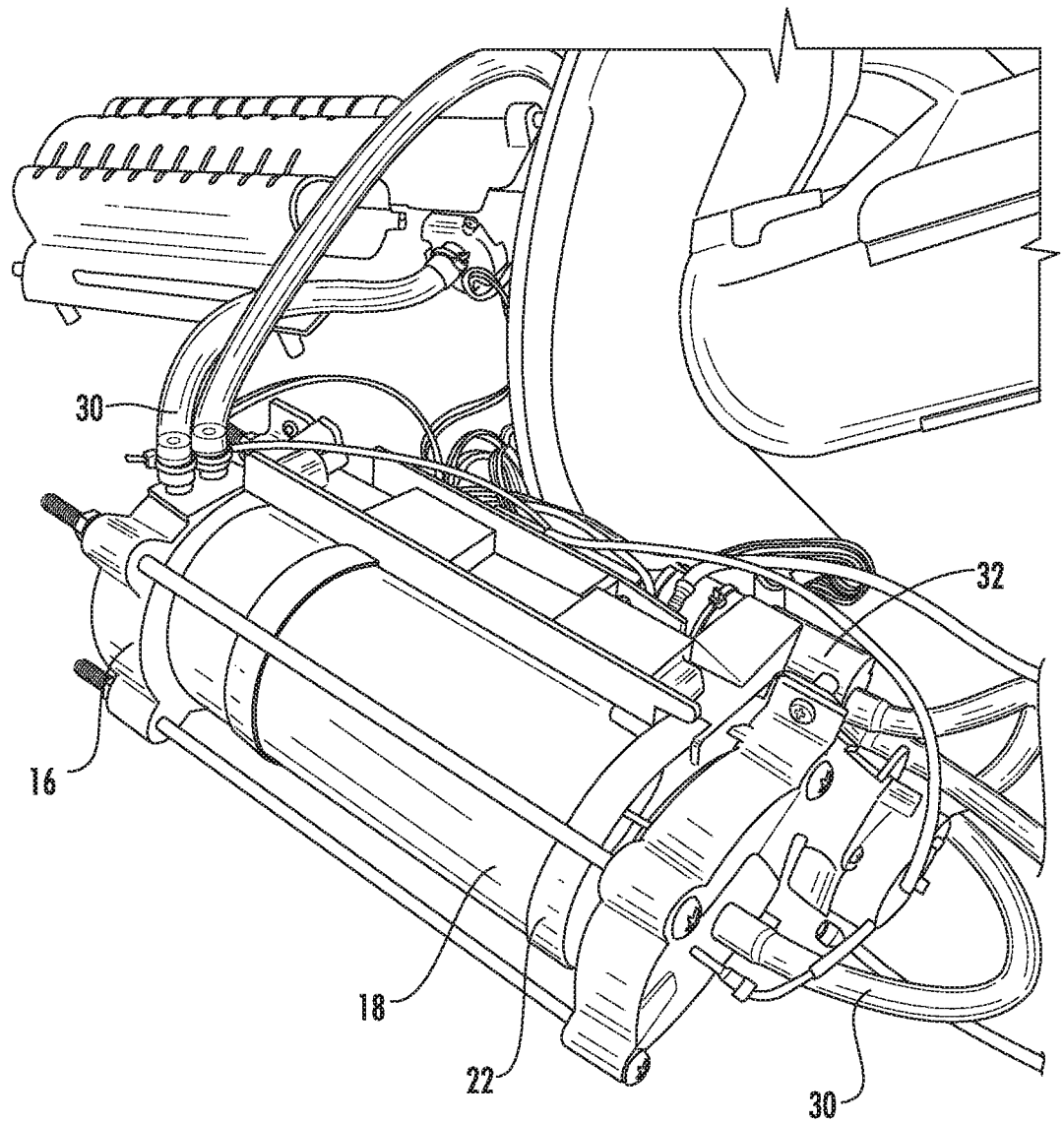
FIG. 20 is perspective view of the control system and housing of the beverage system.
Figure 21:
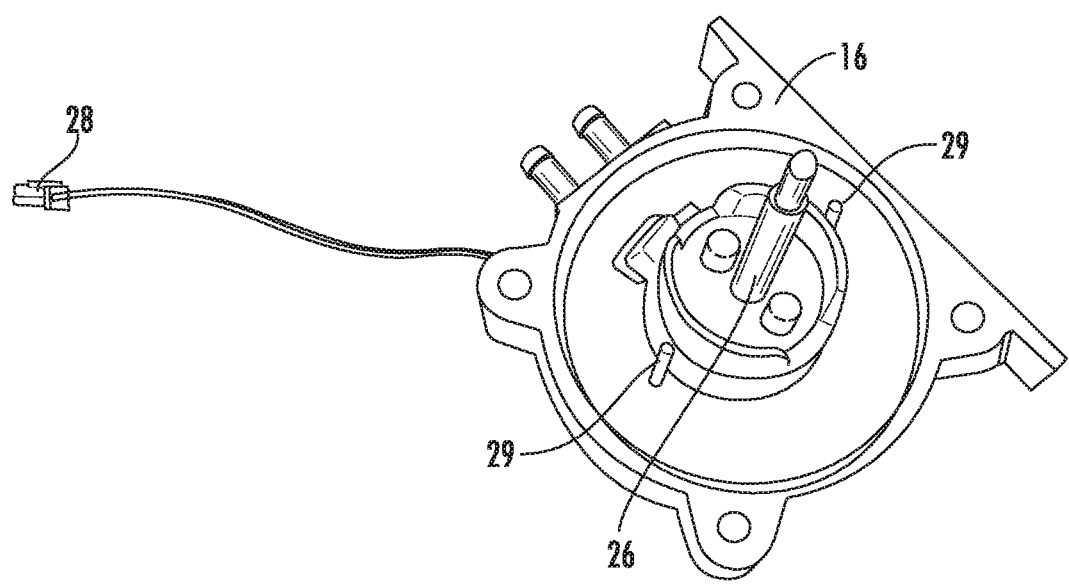
FIG. 21 is a close-up view of the control system.
Figure 22:
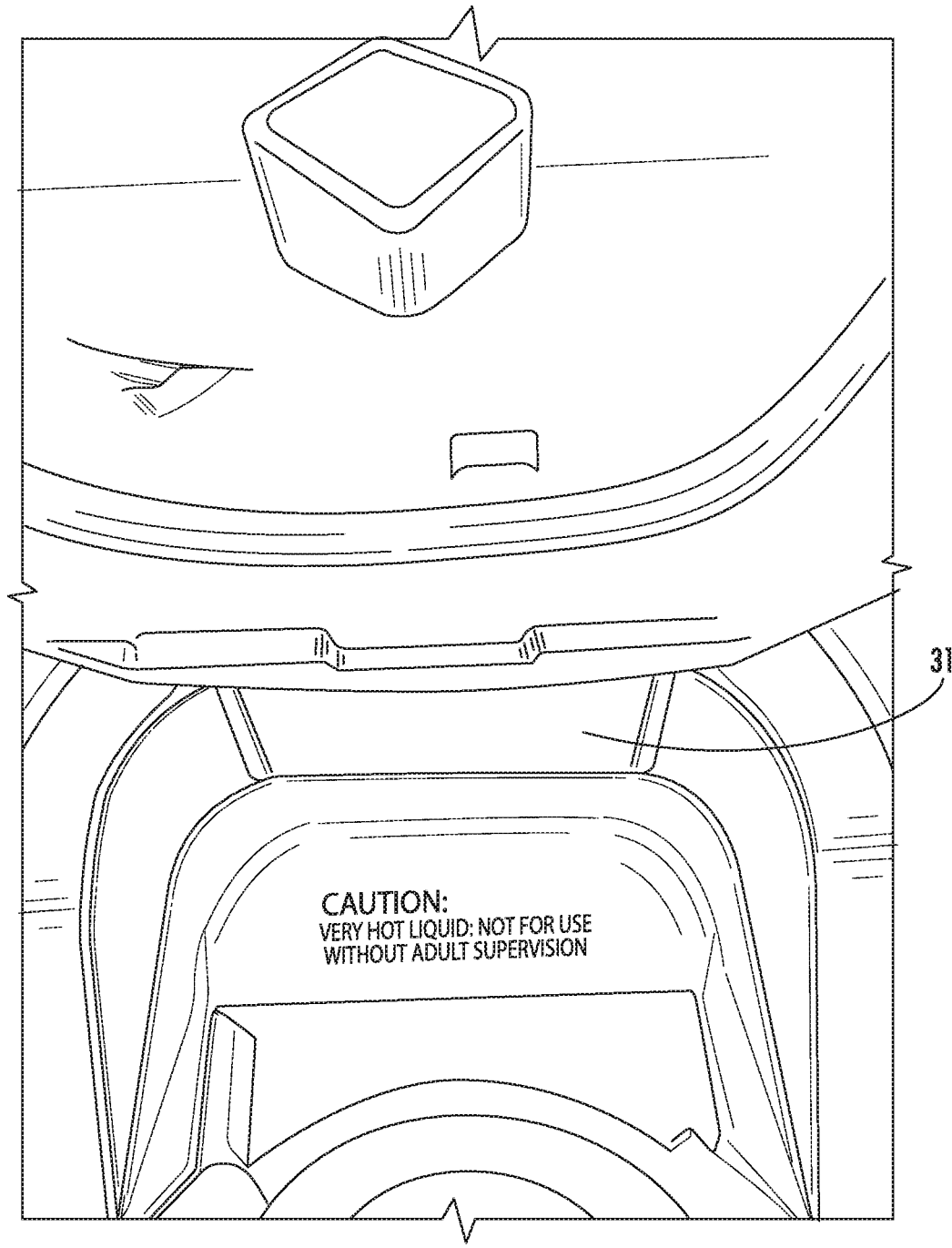
FIG. 22 is a close-up view of the cartridge holder of the beverage system.
Figure 23:
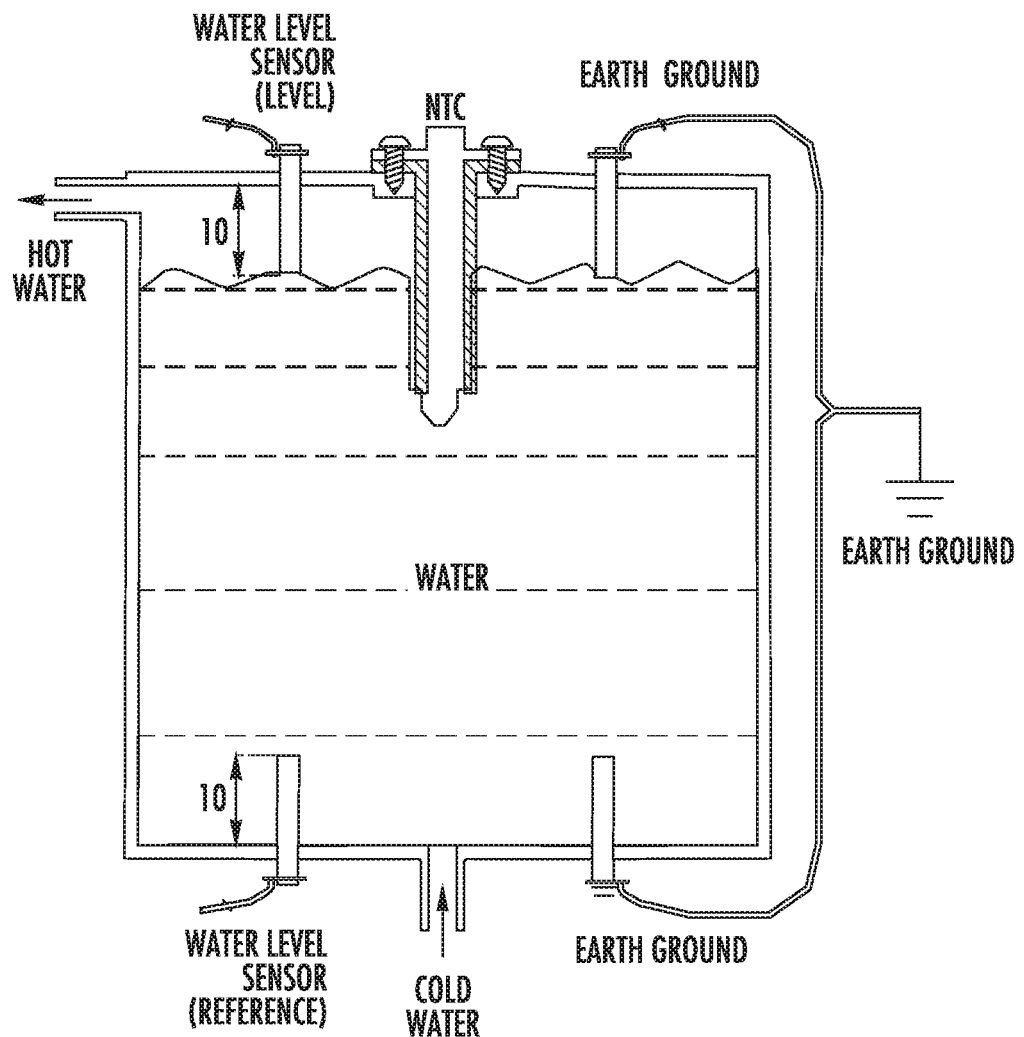
FIG. 23 is a schematic of the control system of the beverage system.

FIGS. 20-21 and 23 refer to the internal components of the system 10. The control system is comprised of a heating element 26, a pressure sensor 29 and a housing 18. In one embodiment the housing has a coating 20 of tin oxide ($SnO_2$). The housing 18 has copper bands 22 for conducting heat. It is preferred that the housing 16 is comprised of glass, as opposed to steel, to avoid generating a metallic taste in the resulting beverage.

While maintaining the water temperature within the optimal range of 195° F.-205° F. is significant, temperatures greater than 210° F. degrees could comprise the heating element 26 and housing 18, causing them to malfunction and ultimately shatter. Therefore, an accurate negative temperature coefficient (NTC) Thermistor 24 is used as a preferred temperature sensor for the beverage system 10. In addition to the Thermistor 24, the present invention also includes a control system 16 having a double safety switch 28 to prevent overheating of liquid. The control system 16 is coupled to the heating element 26. Preferably, the heating element 26 is comprised of a glass-coated coil and the control system 16 comprises a double safety switch 28 to prevent overheating of liquid. The redundant fuses serve to add a higher level of protection in the event one fuse/switch should fail. For example, if one fuse were to malfunction, the second fuse will activate. Pressure gauge sensors 29 are also located in the control system 16 to ensure the water levels are maintained at a desired level in the housing 18 to prevent build-up of pressure as the water is heated. It is recommended that there is at least 10 mm of space between the water level in the housing 18 and the top of the housing 18. Such a water level clearance ensures there is adequate space to compensate for rises in pressure if the water boils.

A tubing system 30 and pump 32 connect the water reservoir 14 to the cartridge holder 34 to channel heated water into the cartridge holder 34. The tubing system 30 includes a water safe leakage system in the event there is a blockage in the tubing resulting in a built up of pressure. Generally, the tubing can withstand approximately 2 bars of pressure, whereas the pump 32 can pump up to 4 bars of pressure. In circumstances where the pressure builds up in the tubing system 30, the pump 32 will continue to operate and a pressure relief opening 31 (shown in FIG. 22) located in the cartridge holder 34 will alleviate any excess pressure.

Figure 5:
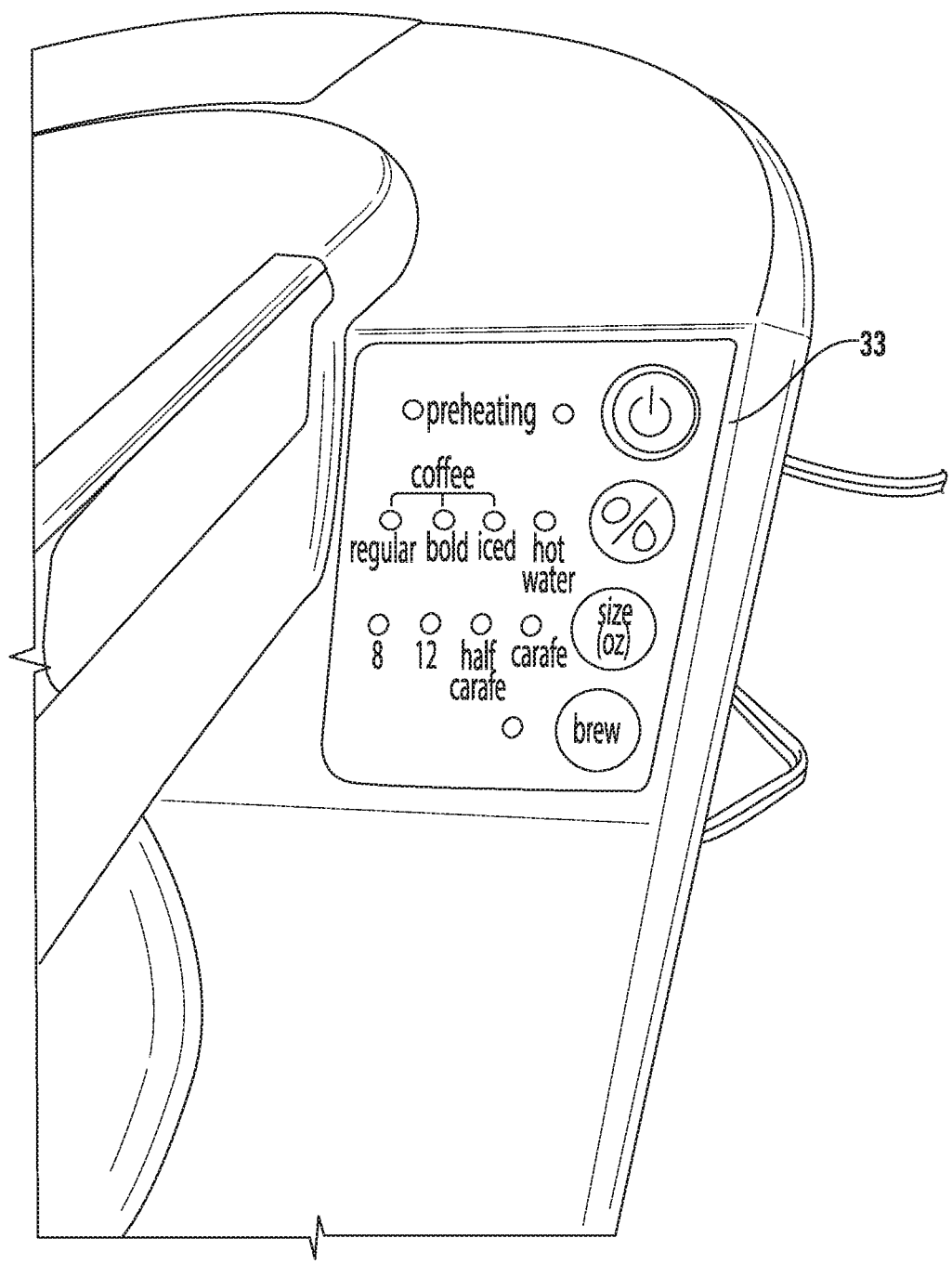
FIG. 5 is a close-up view of the control panel of the beverage system.

A control panel 33 is housed within base 12 and coupled to the control system 30 and pump 32. As shown in FIG. 5, the control panel 33 allows a user to select various parameters for the beverage desired. For instance, a user may select regular, bold or iced coffee, or simply hot water. Additionally, a user can select from a variety of beverage sizes including 8 oz., 12 oz., a half carafe or full carafe. While the system allows selection from set brewing sizes, 8 oz., 12 oz. and 16 oz., other sizes may also be added. Obviously, the 8 oz. selection is good for a stronger brew while the 16 oz. makes a weaker cup of coffee.

Figure 6:
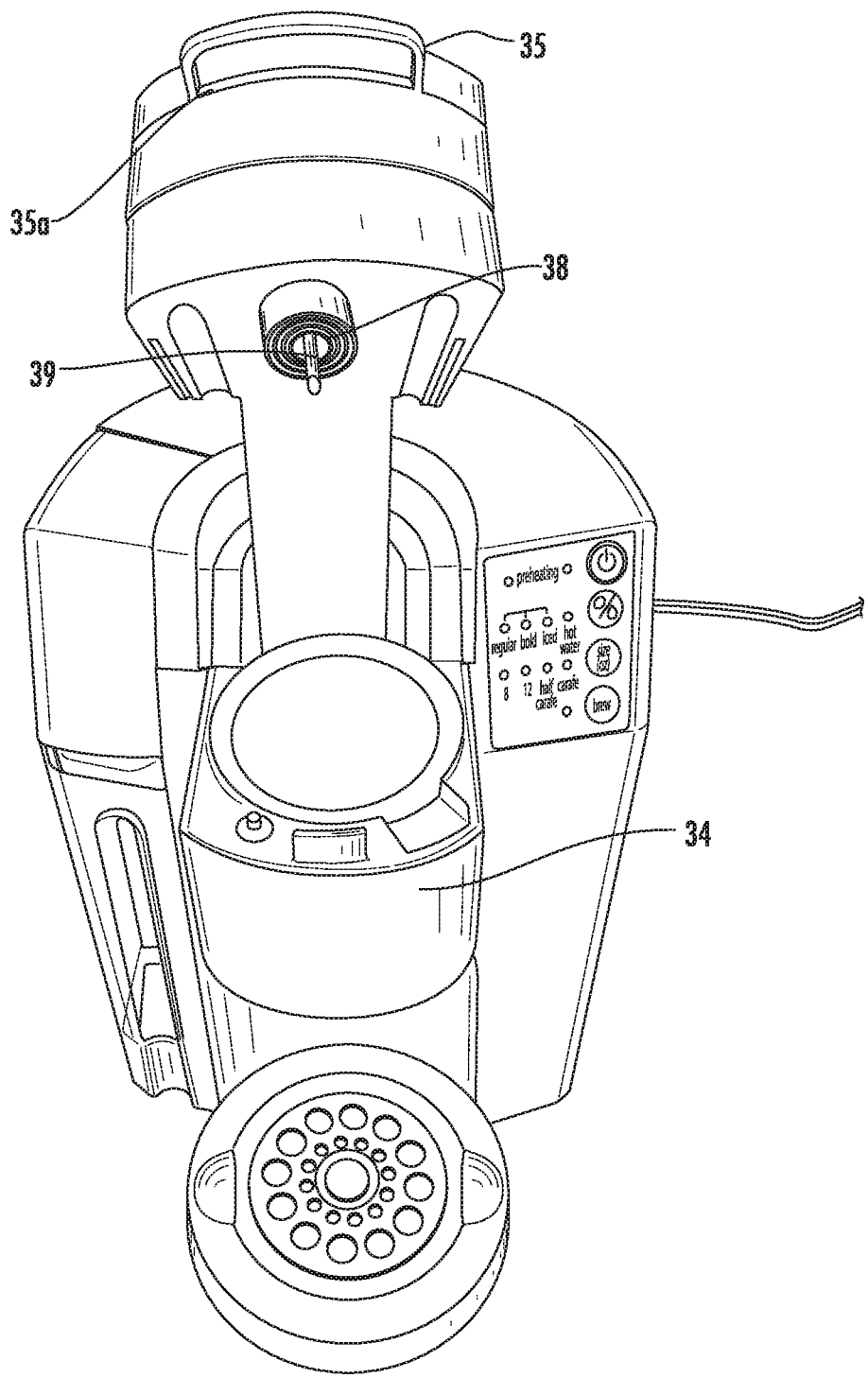
FIG. 6 is a perspective view of the beverage system in an open position.
Figure 7:
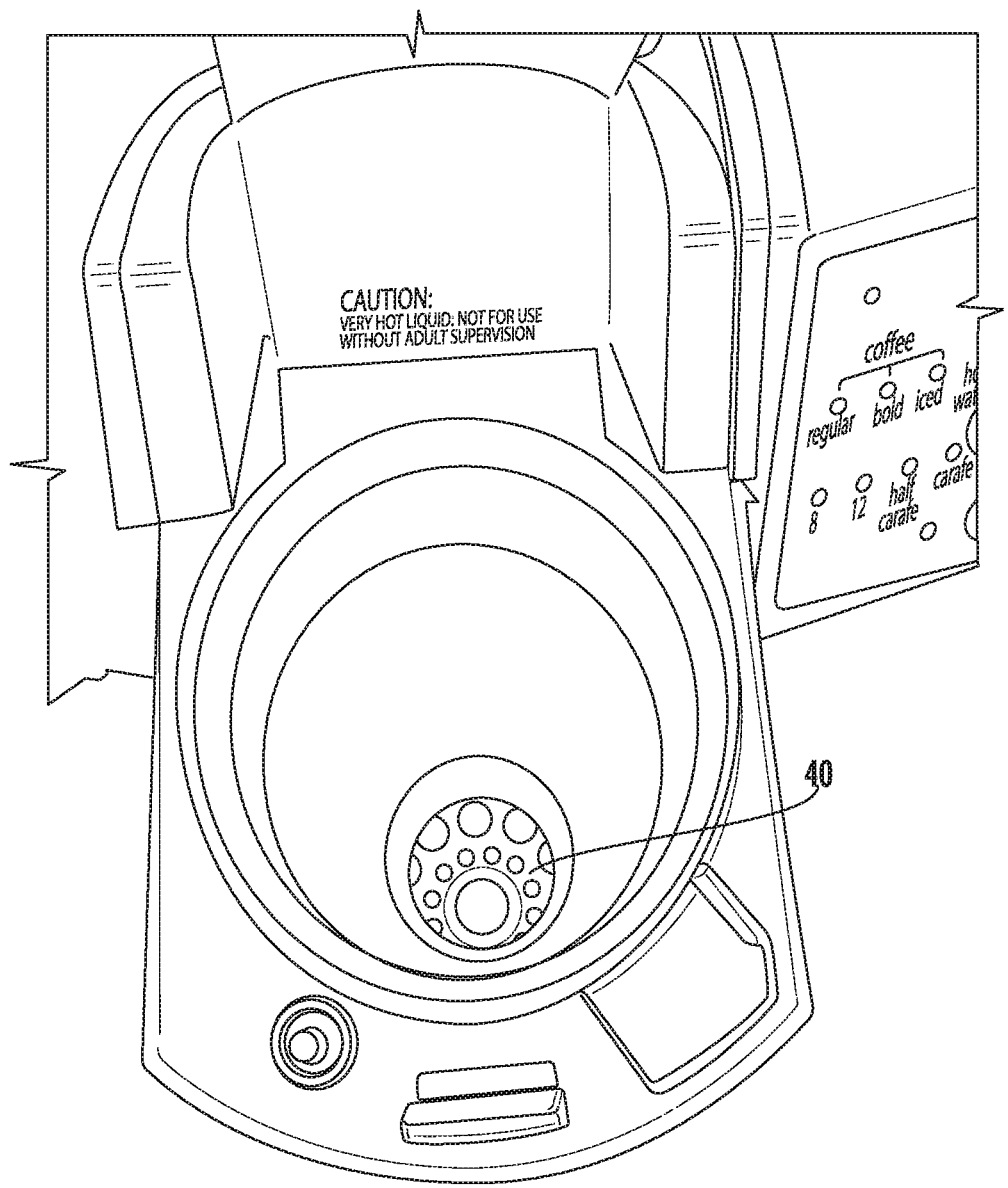
FIG. 7 is a top view of the beverage system showing the cartridge holder and placement of the interchangeable cartridges.
Figure 8:
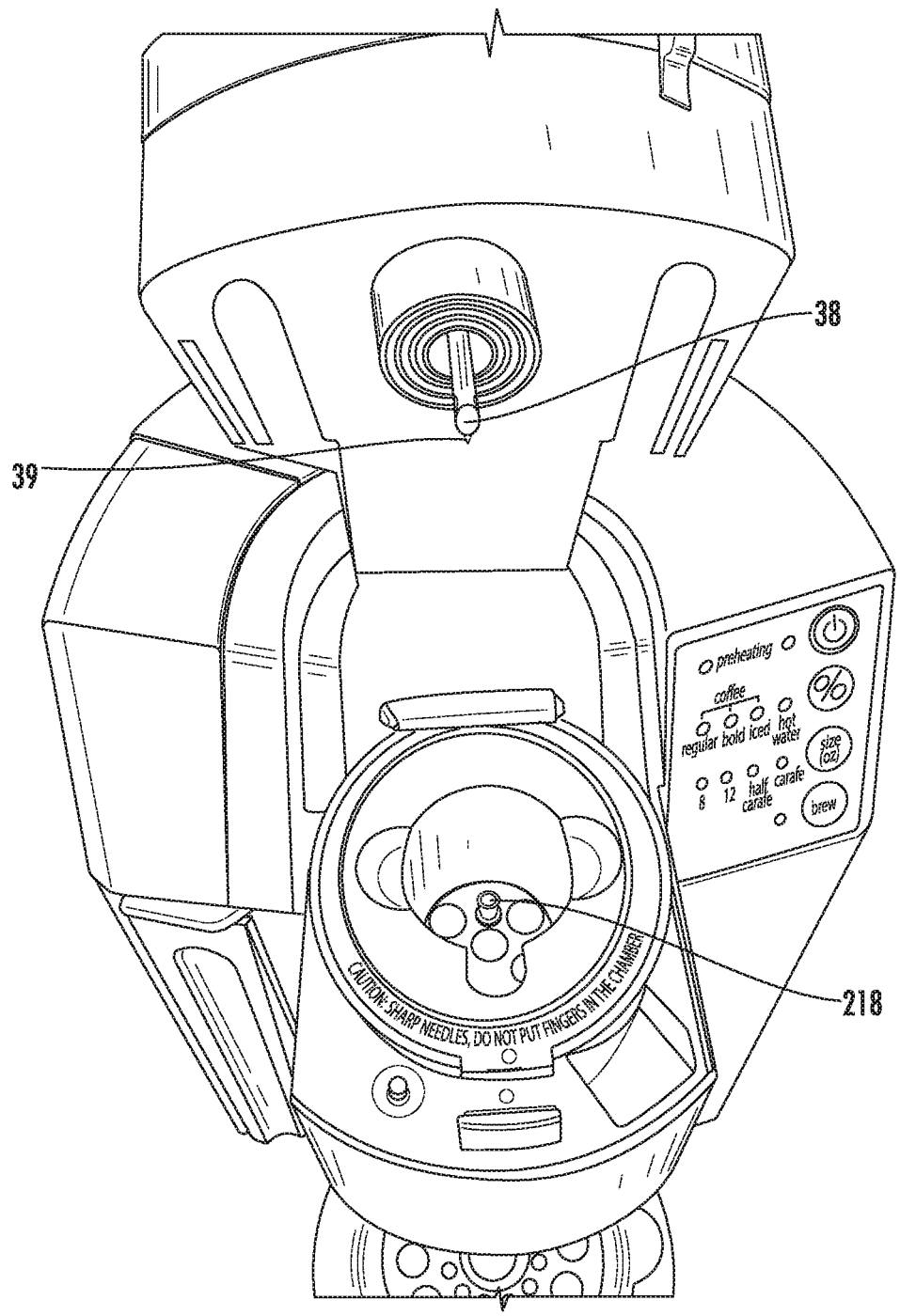
FIG. 8 is top view of the beverage system in an open position showing the pod cartridge in place.

Referring to FIG. 6, the cartridge holder 34 has a hinged cartridge arm 35 with a handle 35a. The cartridge holder 34 is adapted to receive interchangeable cartridges 36 having different configurations and varying functions. Depending on the cartridge type selected, one can use the interchangeable cartridges 36 to make a single cup of coffee or other beverage, a half or full carafe of coffee or simply dispense filtered hot water. When the cartridge arm 35 is in a closed position, the arm 35 is designed to receive heated water from the reservoir 14 and dispense through a water injector 38 at a very high pressure. The heated water ultimately travels through a selected cartridge 36, after which either hot water or brewed liquid exits the bottom spout 40 of the cartridge holder 34. Regardless of the cartridge 36 used, the water injector 38 remains in a fixed positioned on the cartridge arm 35 at all times during operation.

The flow of water is determined by the cartridge used. The configuration of the cartridge allows water to either pass through an individual beverage pod (not shown), completely saturate a bed of coffee grounds in a filter basket 306, or simply dispense hot water. Thus, an advantage of the present invention is the ability to use a single beverage system to make an individual cup of coffee using beverage pods or a full-sized carafe of coffee using freshly ground coffee beans.

As mentioned above and shown in FIGS. 6-8, the cartridge holder 34 is adapted to receive interchangeable cartridges 36 that fit securely in the cartridge holder 34. The cartridges 36 include a hot water cartridge 100, a pod cartridge 200, and a grounds cartridge 300. Each interchangeable cartridge 36 is uniquely constructed to serve a different function. For instance, FIGS. 10-12 disclose a hot water cartridge 100 having a detachable lid 108 with an inlet 110 through which heated water is dispensed from the water injector 38. The lid 108 may be detachable or hinged and has a ridge 112 to easily open and close.

In operation, a water cartridge 100 is placed in the cartridge holder 34 and the cartridge arm 35 is closed. When the cartridge arm 35 is closed, the water injector 38 fits directly in the inlet 110 of the water cartridge lid. Once the water is heated to its optimal temperature, it is dispensed from the water injector 38 of the cartridge arm 35, through the inlet 110 of the lid 108 of the water cartridge 100 and is guided through a narrow funnel 102 and exits through an outlet 106 of the cartridge 100 and into a container 44. The funnel 102 has at least one angled sidewall 104 to ensure the water is directed towards the spout 106 and prevents pooling. The narrow funnel design guides the flow of water directly out of the spout 106 to prevent any heat loss. In other words, the water cartridge 100 directs the flow of water directly out of the spout 106 of the cartridge 100 and into the container 44, so it does not collect in the cartridge 100 and cool off. The hot water cartridge 100 can be used to prepare food or beverages that require adding only hot water, such as instant soups, teas and hot chocolate to name a few.

Figure 9:
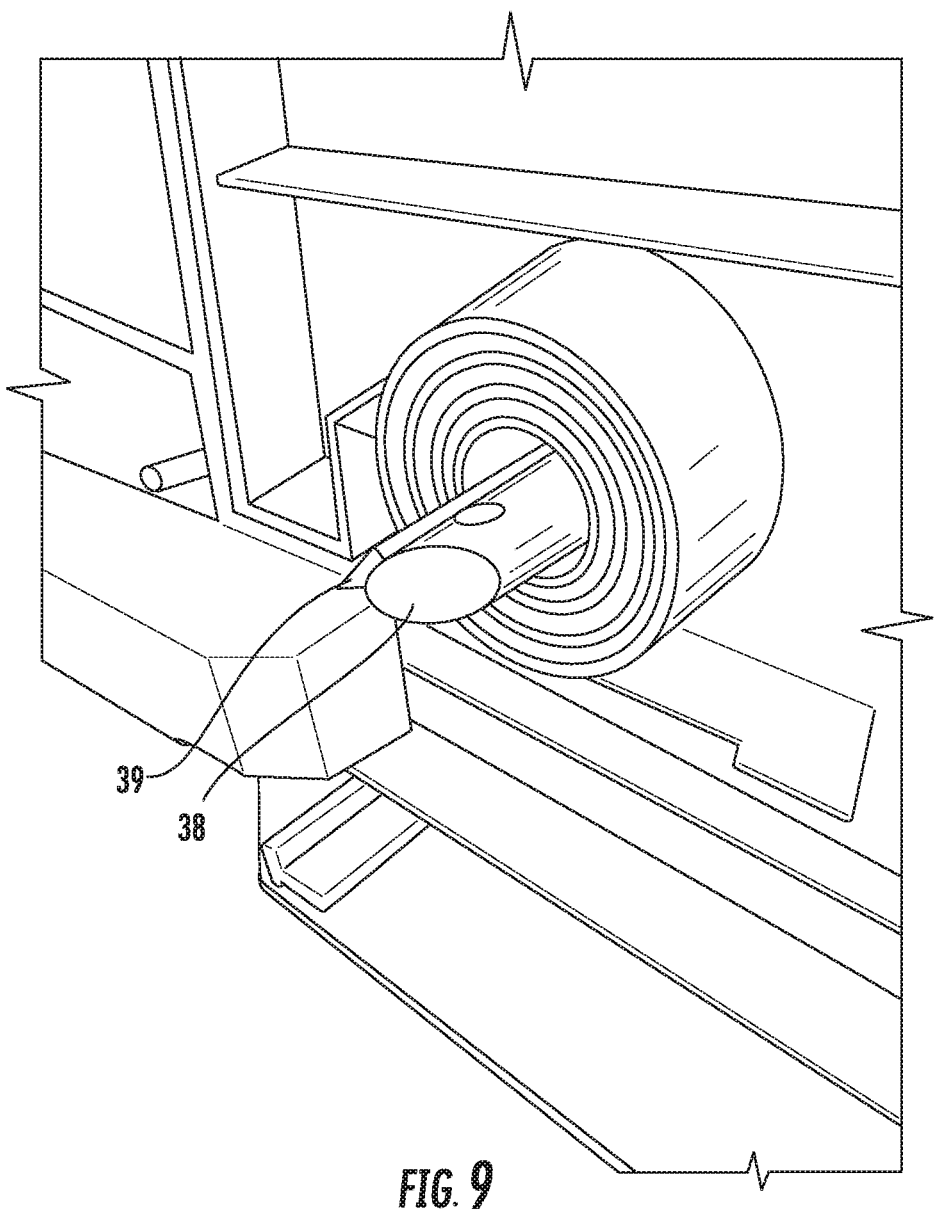
FIG. 9 is a close-up view of the water injector and first puncture device.
Figure 10:
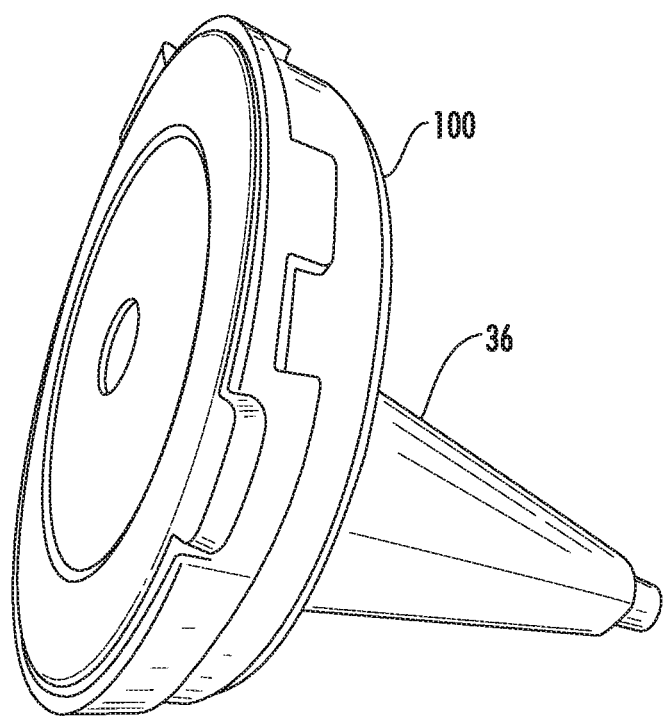
FIG. 10 is perspective view the water cartridge of the beverage system.
Figure 11:
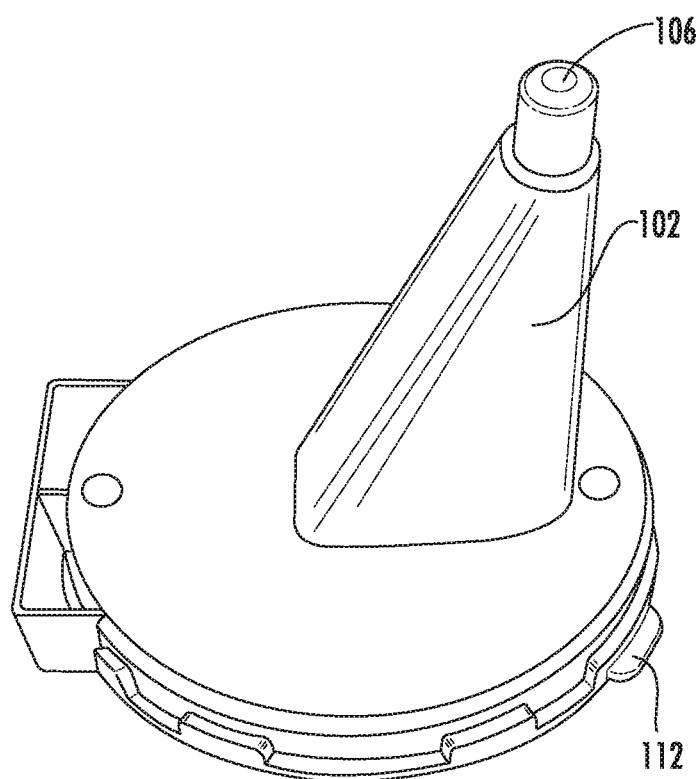
FIG. 11 is a bottom view of the water cartridge of the beverage system.
Figure 12:
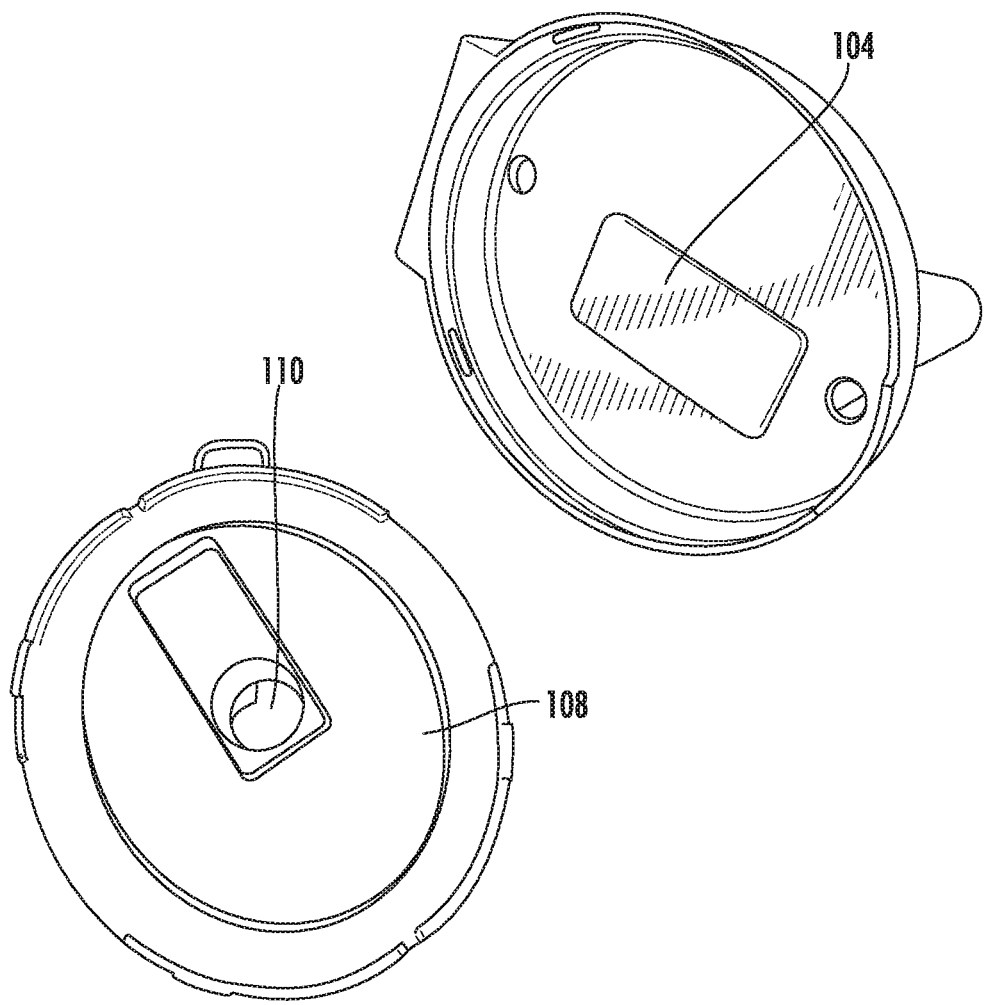
FIG. 12 is a perspective view of the water cartridge with the lid removed of the beverage system.
Figure 13:
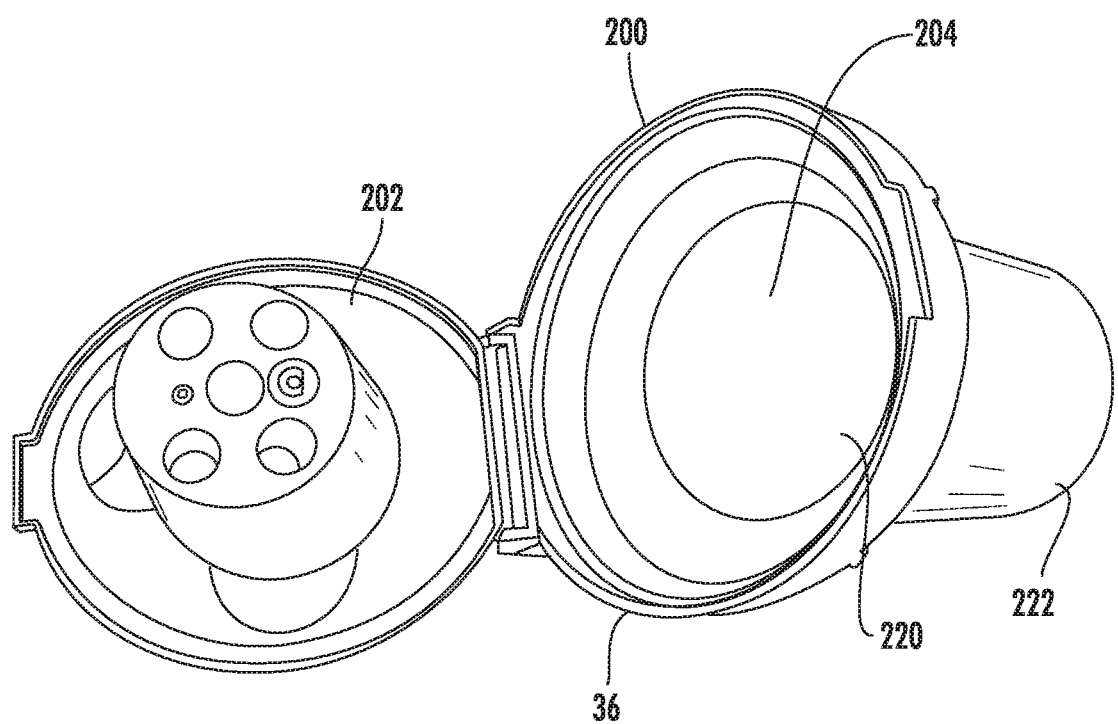
FIG. 13 is a perspective view of the pod cartridge in an open position of the beverage system.
Figure 14:
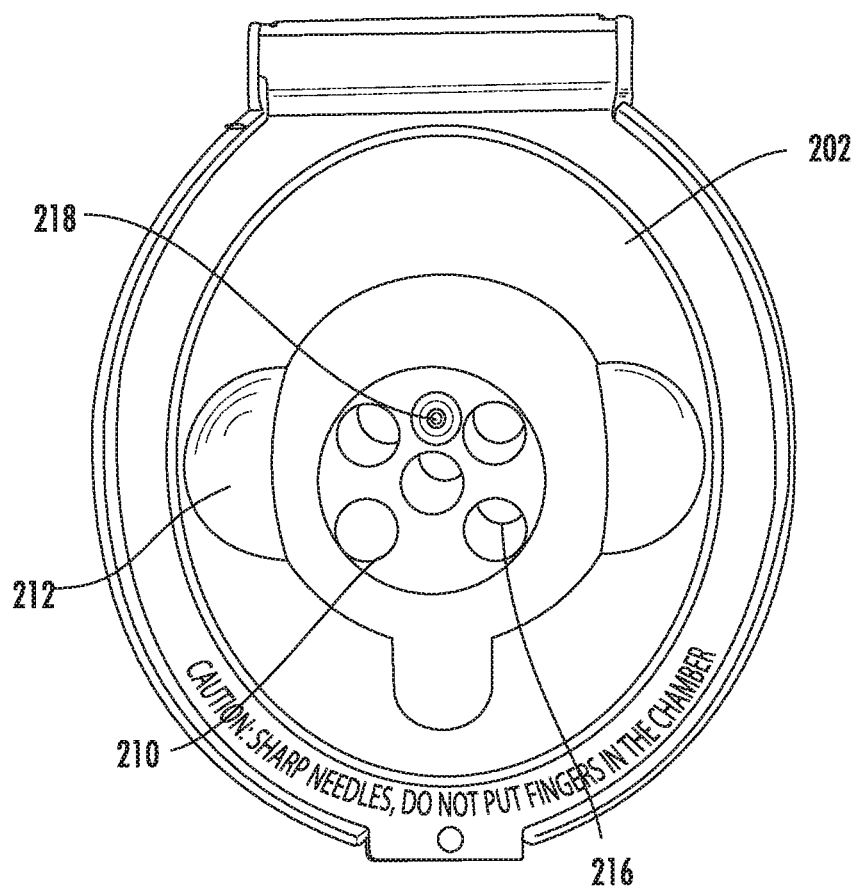
FIG. 14 is a top view of the pod cartridge in an open position.

FIGS. 13-14 disclose a pod cartridge 200 having a lid 202 hinged to a pod cavity 204. While a hinge is disclosed, it is possible to attach the lid 202 to the pod cavity 204 with any sort of opening and closing mechanism such as snaps, teeth or the like. Alternatively, the lid 202 could be fully removed. As shown in FIG. 14, the lid 202 of the pod cartridge 200 has a pod chamber 210 for receiving individual flavored beverage pods. Depressions 212 are included in the lid 202 to allow a user to readily insert and remove a pod from the pod chamber 210. The pod chamber 210 can be used with either disposable beverage pods or reuseable beverage pods. The bottom of the pod chamber 214 includes a second tubular puncture device 218 designed to pierce the bottom of a beverage pod. A first puncture device 39 is included on the cartridge arm 35 and is adjacent to the water injector 38. As shown in FIG. 9, the water injector 38 is angled so when the first puncture device 39 pierces the top of a beverage pod, the water injector also punctures the top of the beverage pod. This ensures water will be forced directly into the beverage pod from the reservoir 14. A plurality of openings 216 are located on the bottom 214 of the pod chamber 210. The pod cavity 204 has curved sidewalls 206 that conform to the shape of the pod chamber 210 so when the lid 202 is closed, the pod chamber 210 fits securely within the pod cavity 204. The bottom of the pod cavity 220 is angled to guide liquid through an outlet 222 into a container 44 and prevent pooling. When the system 10 is in a closed position with the pod cartridge 200, there is a space between the pod chamber 210 and pod cavity 204. This space relieves pressure created by the water being forced through the water injector 38.

In operation, a pod cartridge 200 is placed in the cartridge holder 34 and the cartridge arm 35 is closed. When the cartridge arm 35 is closed, the water injector 38 and first puncture device 39 fit directly in the inlet of the pod cartridge lid. As pressure is applied when closing the cartridge arm 35, the second tubular puncture device 218 pierces the bottom of the beverage pod, while the first puncture device 39 and the water injector 38 pierces the top of the beverage pod. Once the water is heated to its optimal temperature, it is dispensed at a very high pressure from the water injector 38 into the beverage pod where the water saturates the coffee grounds and undergoes extraction. Due to the force of water coming through the water injector 38, after extraction, the liquid is forced through the second tubular device 218 at the bottom of the pod chamber 210. The extracted liquid then passes through to the pod cavity 204 to the bottom 220 of the pod cavity. The bottom 220 of the pod cavity is angled to guide the liquid through an outlet 222 and into a container 44. The pod cartridge 200 can be used to prepare beverages that require commercially available flavor pods, including coffee, teas, hot chocolate and chai teas to name a few.

Figure 15:
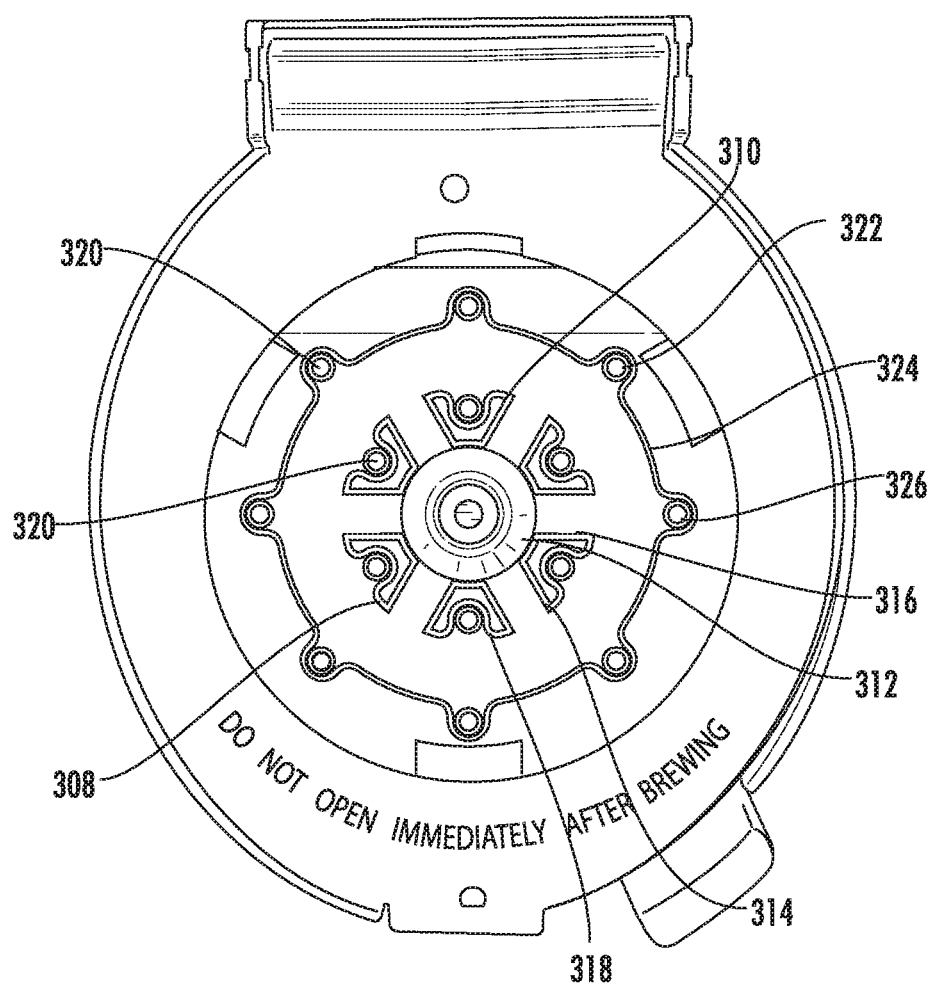
FIG. 15 is a top view of the lid of the grounds cartridge with the cap removed of the beverage system.
Figure 16:
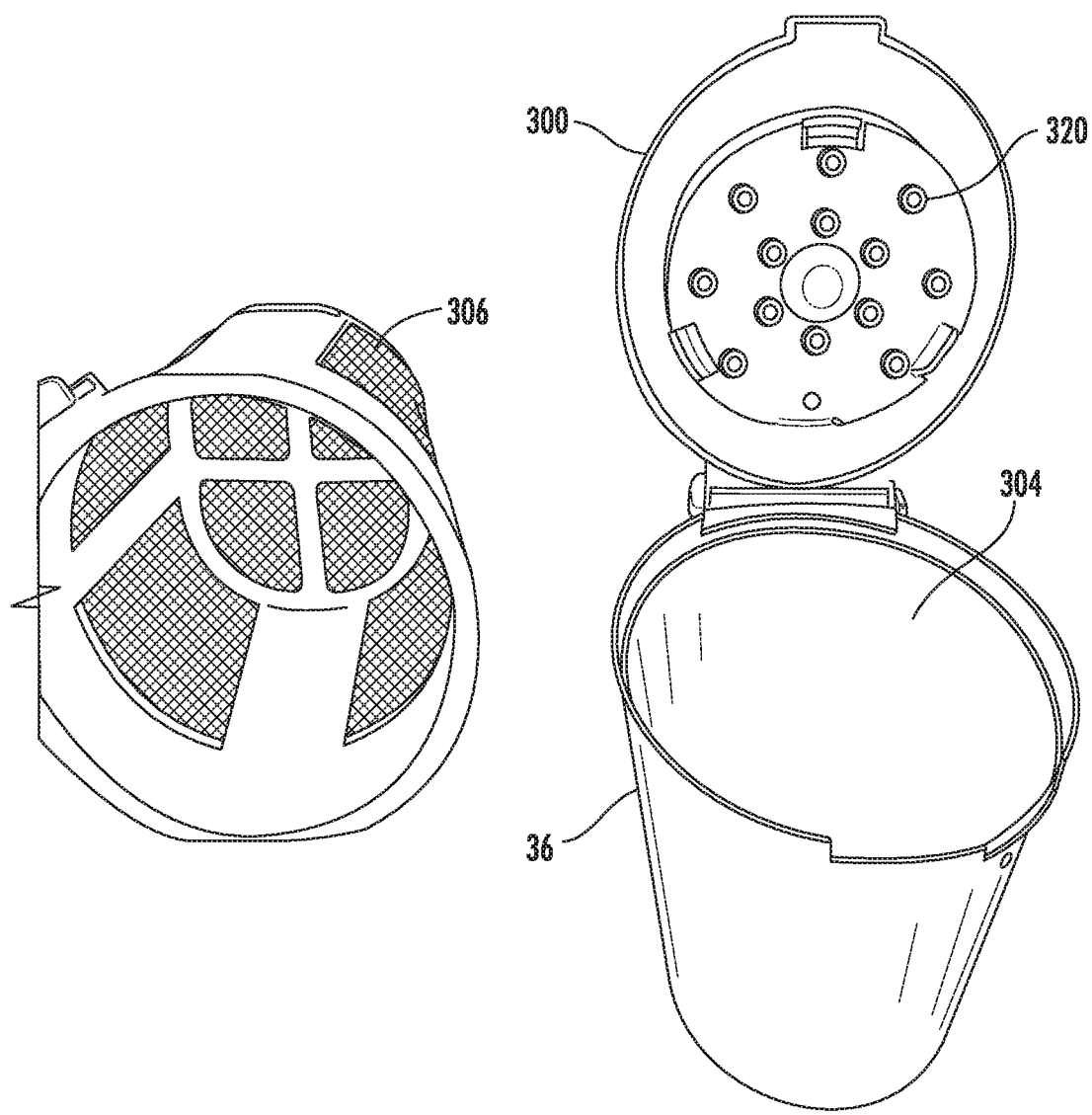
FIG. 16 is a perspective view of the bottom lid of the grounds cartridge in an open position with the filter removed of the beverage system.
Figure 17:
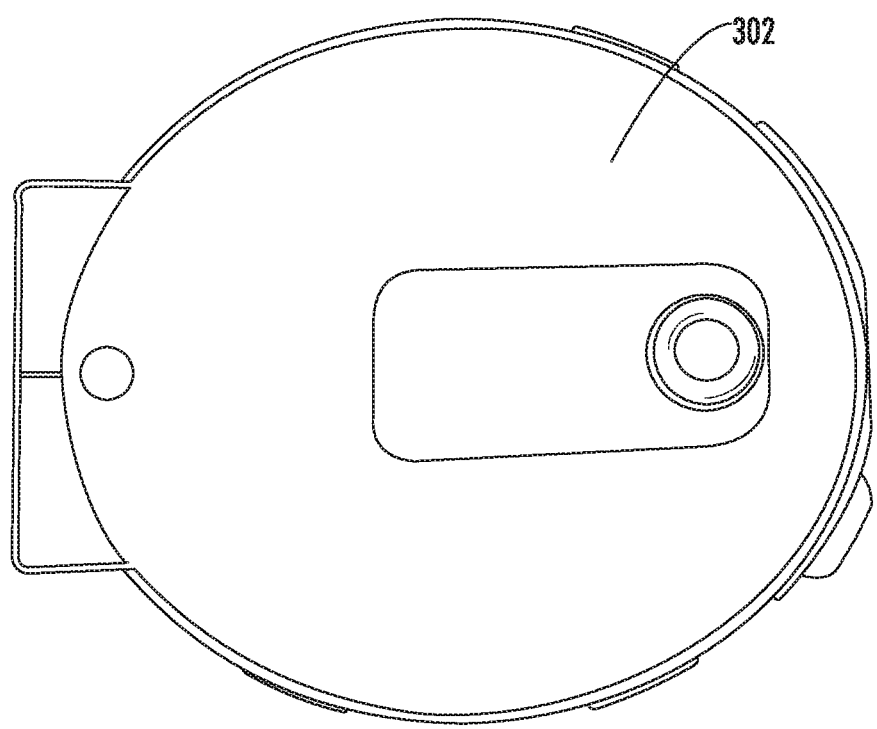
FIG. 17 is a top view of the grounds cartridge of the beverage system.

FIGS. 15-17 disclose a grounds cartridge 300 having a lid 302 hinged to a grounds receptacle 304. As discussed above, the hinged lid 302 may be attached by an opening and closing mechanism, or alternatively, may be fully removed. As shown in FIG. 16, the grounds receptacle 304 is configured to securely fit a filter basket 306. While a reusable filter is preferred, it is foreseeable to use a disposable filter with the present invention. The filter basket 306 is designed to hold any amount of coffee grounds necessary to brew a desired amount of coffee. For instance, the filter 306 is large enough to hold coffee grounds sufficient to brew a full-sized carafe of coffee, but can also be used to hold coffee grounds sufficient to brew any amount less than a full-sized carafe.

Another significant factor when brewing coffee is to ensure the grounds are adequately saturated during the brewing process. Specifically, infusion brewing involves water constantly flowing through a bed of ground coffee and filter. This is also known as drip brewing. In order for proper extraction to take place, a constant supply of water is provided to completely saturate the bed of coffee grounds. However, since there are more coffee grounds in a filter basket compared to a beverage pod, the water must cover a greater surface area to ensure sufficient saturation. The present invention solves this problem by using a lid 302 that maximizes the surface area for water to flow and saturate the bed of coffee grounds.

FIG. 15 depicts one embodiment of the present invention of a lid 302 comprising a first ring 308 and a second ring 322. The first and second rings 308, 322 are comprised of a plurality of delivery holes 320. As shown in FIG. 15, the first ring 308 further comprises a plurality of protrusions 310 that collectively form a circle. Each protrusion 310 has a first wall 312 facing the lid's center, two sidewalls 314, 316, and a curved back wall 318 that surrounds a delivery hole 320 for water to pass. The second ring 322 further comprises a circular wall 324 with bulges 326 that surround a series of delivery holes 320 through which water can pass. The distance from the center of the lid, to the delivery holes 320 of this first ring 308 is substantially the same distance from the center of the lid to delivery holes 320 of the second ring 322. The center of the lid is where the water injector 38 is positioned when the cartridge arm 35 is in a closed position. Significantly, the distance from the center of the lid to delivery hole 320 of the first ring 308 is substantially equi-distance from the center of the lid to delivery hole 320 of the second ring 322. As shown in FIG. 16, the delivery holes 320 pass through the bottom part of the lid 302 so water can flow evenly over the coffee grounds in the grounds cartridge 300. A cap 328 snaps on to the lid 302 to ensure all liquids are contained during use. The cap 328 has an aperture 303 in the center for receiving water from the injector 38.

The present invention contemplates a variety of configurations that could be used to in the grounds lid 302 to direct water flow through delivery holes 320, the importance being that when the water flows, the distance the water travels from the center of the lid to the delivery holes of the first ring is equi-distance to the distance the water travels to the delivery holes of the second ring. Thus, any wall, obstacle or other such impediment that diverts the flow of water in this manner may be used in connection with the present invention, as long as the path of water from the water injector 38 to the delivery holes 320 of each ring is equi-distance to one another.

In operation, a grounds cartridge 300 is placed in the cartridge holder 34 and the cartridge arm 35 is closed. When the cartridge arm 35 is closed, the water injector 38 fits directly in the aperture 303 of the lid 302 of the grounds cartridge. Once the water is heated to its optimal temperature, it is dispensed from the water injector 38 of the cartridge arm 35, through the aperture 303 of the lid 302. Water floods the center of the lid 302 and the protrusions 310 and wall 324 redirect water to delivery holes 320, along the circumference of the rings 308, 322. Since the delivery holes 320 are generally equi-distant from the center of the lid, as the water floods the lid from the water injector 38, the flow of water will travel the same distance to the delivery holes 320 causing the water to flow through all the delivery holes simultaneously. As shown in FIG. 15, the delivery holes 320 are not just in the center of the lid, but are dispersed all over the lid. In one embodiment there are at least two concentric rings of delivery holes. This effectively results in optimal surface area coverage for water to saturate the coffee grounds and maximizes the flow of water over the grounds in the filter basket 306.

Figure 2:
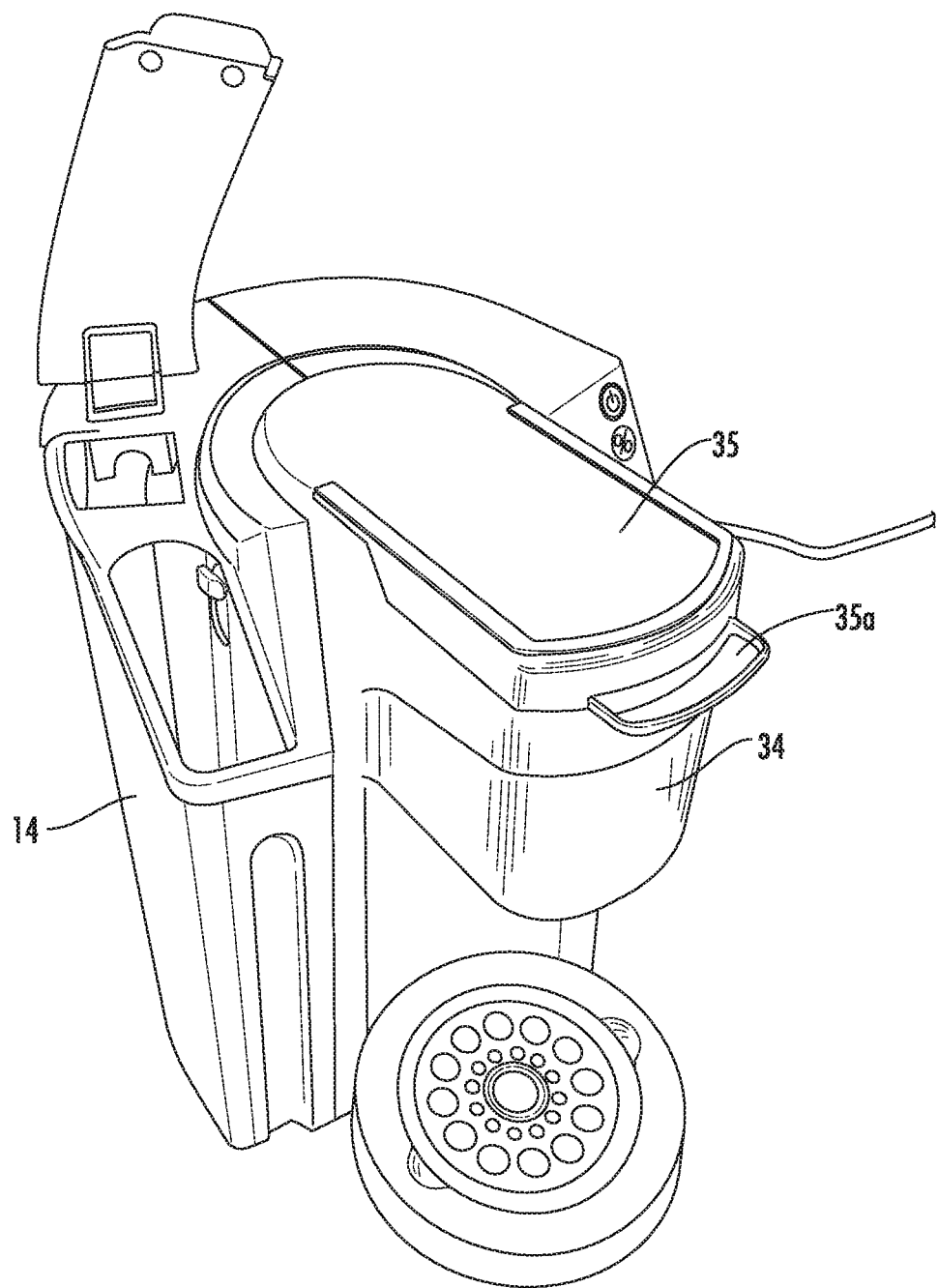
Figure 3:
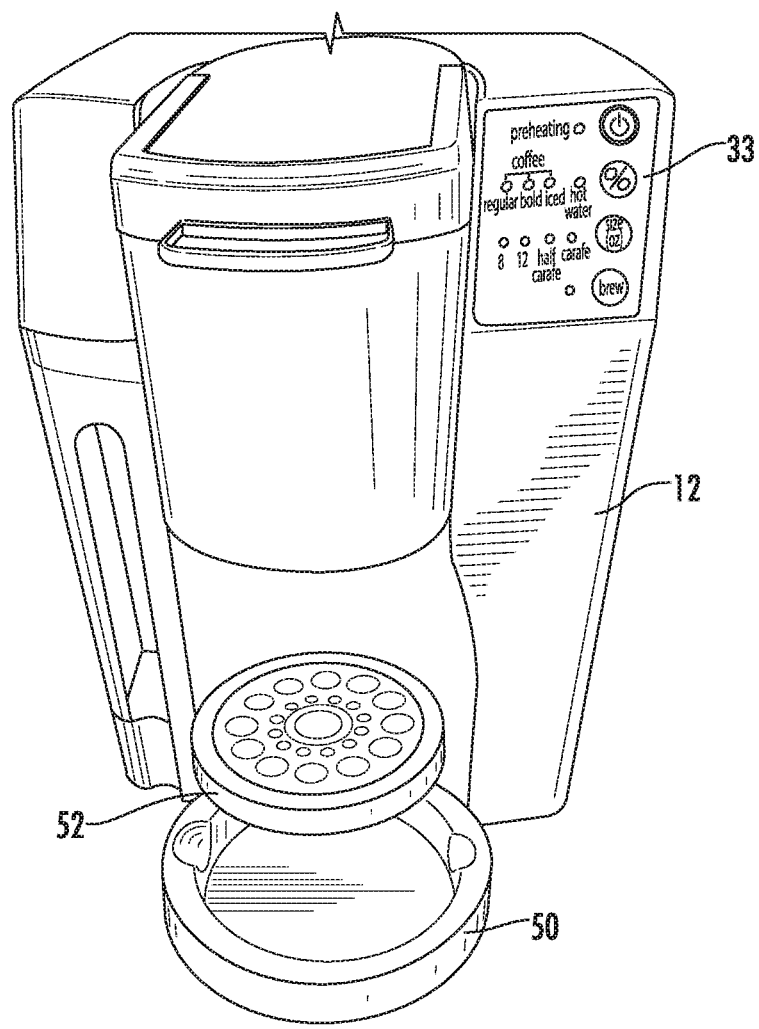
FIG. 3 is a perspective view of the beverage system with the adjustable plate.
Figure 4:
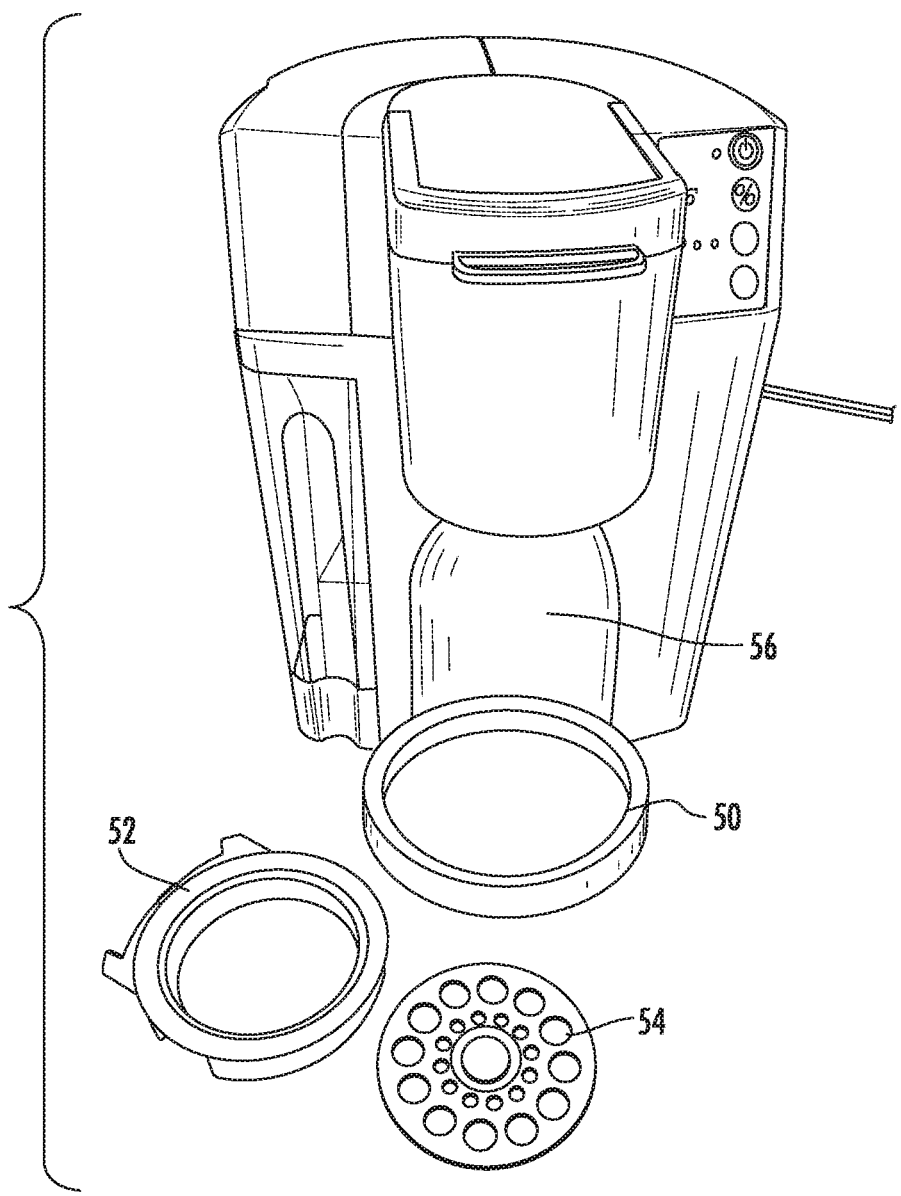
FIG. 4 is a perspective view of the beverage system and components of the container base.
Figure 18:
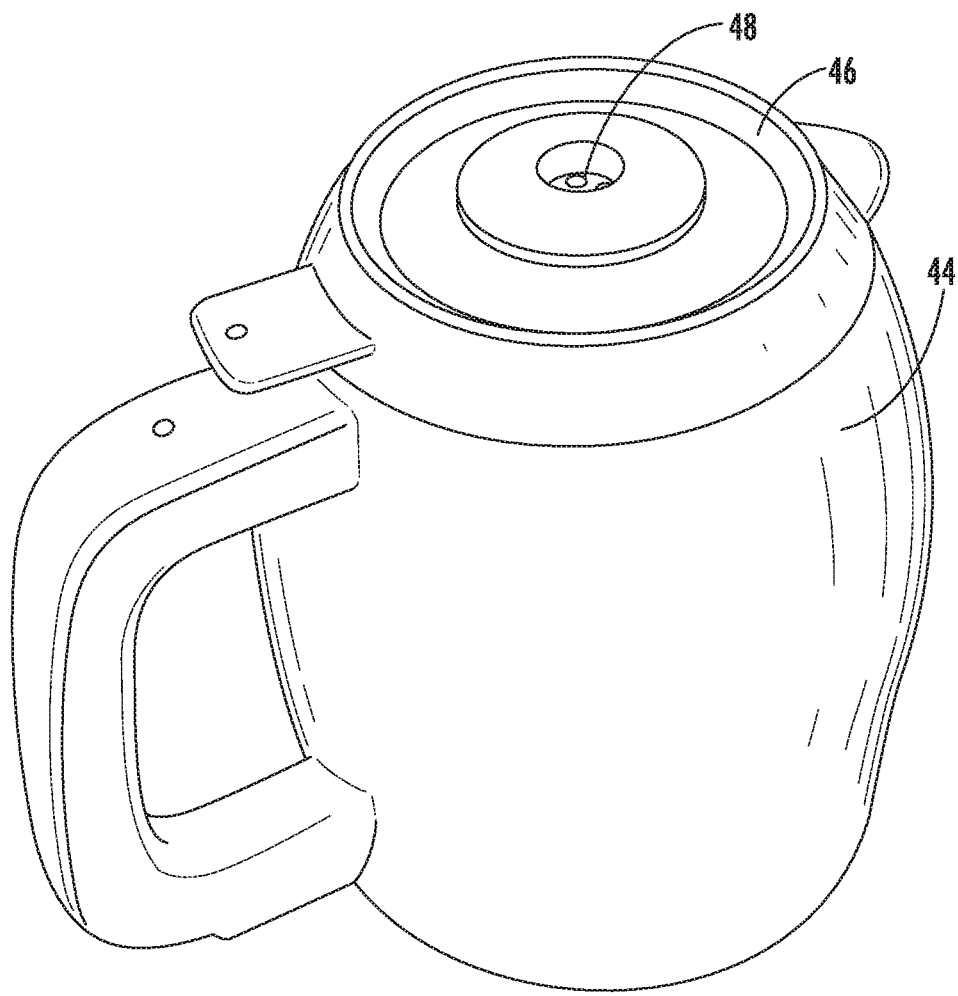
FIG. 18 is a perspective view of the container of the beverage system.
Figure 19:
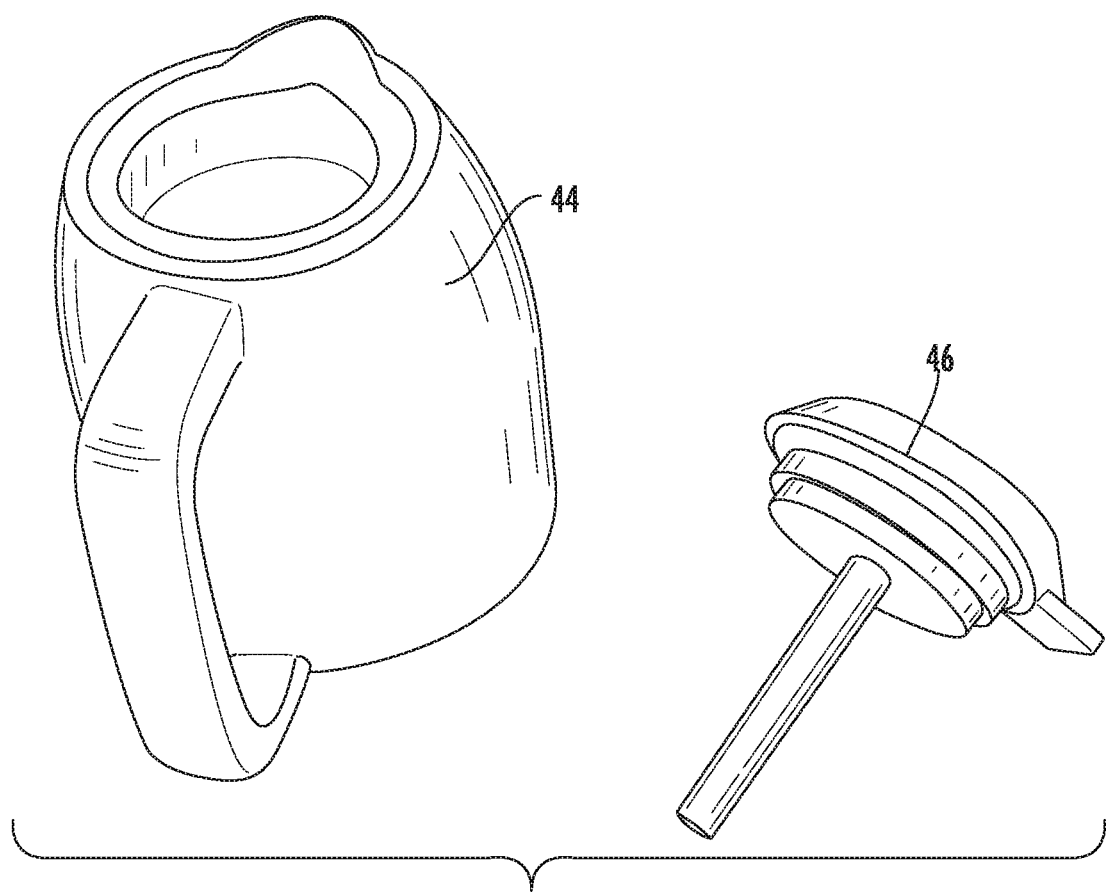
FIG. 19 is a perspective view of the container of the beverage system with the lid removed.

A container 44 such as a coffee mug, thermos or carafe is configured to sit in an area adjacent the base unit 12 directly below the cartridge holder 34 on a container base 50. FIGS. 18-19 depict a container in one embodiment of the present invention. The container base 50 is configured to receive an adjustable plate 52 that rests securely within the container base 50, as seen in FIG. 2. A separate drainage plate 54 rests within the adjustable plate 52 for spills to drain into the adjustable plate 52. As shown in FIG. 3, the adjustable plate 52 may be raised or lowered by fastening the plate 52 into grooves 56 located in the base of the system 10. When brewing a single cup of coffee, the plate 52 may be raised to minimize the distance the liquid will travel after brewing to prevent heat loss. Each outlet of the interchangeable cartridges 36 are configured such that when the system is in a closed position the outlet of the interchangeable cartridge 36 extends beyond the outlet of the cartridge holder spout 40. Thus, the exiting liquid is exposed to little or no ambient air before it enters the container 44, further minimizing the amount of heat lost. The container 44 includes a lid 46 having an inlet opening 48 for accepting a heated liquid via spout 40 at the bottom of the cartridge holder 34. Inlet opening 48 almost touches the bottom outlet of the interchangeable cartridge 36.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. An automatic beverage system comprising:
a water reservoir;
a control system comprising a heating element, a pressure sensor and a housing, the heating element to control a temperature of water in the housing, the pressure sensor to regulate water levels in the housing;
a pump and tubing system connecting the water reservoir to the housing and connecting the housing to a cartridge arm, the pump and tubing system used to move water from the water reservoir to the cartridge arm, the cartridge arm having a water injector fixed to the cartridge arm and for receiving water from the housing during operation;
a cartridge; and
a cartridge holder coupled to the cartridge arm, the cartridge holder configured to receive the cartridge,
wherein the water injector dispenses water into the cartridge to form a beverage;
wherein the cartridge is an interchangeable grounds cartridge comprising a lid having a plurality of delivery holes through which water flows into the cartridge, the delivery holes arranged into at least first and second rings concentric to a center of the lid, wherein the lid further comprises an impediment for diverting a flow of water from the water injector positioned at the center of the lid through the delivery holes such that a distance of the flow of water from the center of the lid to the delivery holes of the first ring is equal to a distance of the flow of water from the center of the lid to the delivery holes of the second ring, wherein the impediment comprises a plurality of protrusions partially surrounding each respective delivery hole of the first ring and a circular wall surrounding the delivery holes of the second ring.

2. The beverage system of claim 1, wherein the cartridge arm has a first puncture device.

3. The beverage system of claim 1, further comprising a water cartridge, wherein the water cartridge comprises a funnel configured to channel water from the water injector through an outlet into a container.

4. The beverage system of claim 1, further comprising a pod cartridge, wherein the pod cartridge comprises a pod chamber and pod receptacle.

5. The beverage system of claim 4, wherein the pod chamber comprises a second puncture device, and the pod chamber is configured to receive a beverage pod and allow water to enter and exit the beverage pod before being delivered to a container.

6. The beverage system of claim 5, further comprising a beverage pod configured to fit within the pod cartridge and allow liquid to enter and exit the pod before being delivered to the container when the beverage system is in a closed position.

7. The beverage system of claim 1, wherein the housing is glass.

8. The beverage system of claim 7, wherein the heating element comprises a copper band contacting the housing for conducting heat.

9. The beverage system of claim 1, wherein the control system comprises an NTC thermistor for controlling the water temperature.

10. The beverage system of claim 1, wherein the control system comprises a safety switch to prevent overheating of water.

11. The beverage system of claim 10 wherein the safety switch comprises a redundant mechanism.

12. The beverage system of claim 1, further comprising a container base positioned under the cartridge holder for receiving a container.

13. The beverage system of claim 12, furthering comprising an adjustable plate positioned within the container base.

14. The beverage system of claim 1, wherein an outlet of the interchangeable cartridge extends beyond a spout of the cartridge holder.

* * * * *